M. G. COUCH.
Hay Loader.
No. 32,860.
2 Sheets—Sheet 1.
Patented July 23, 1861.
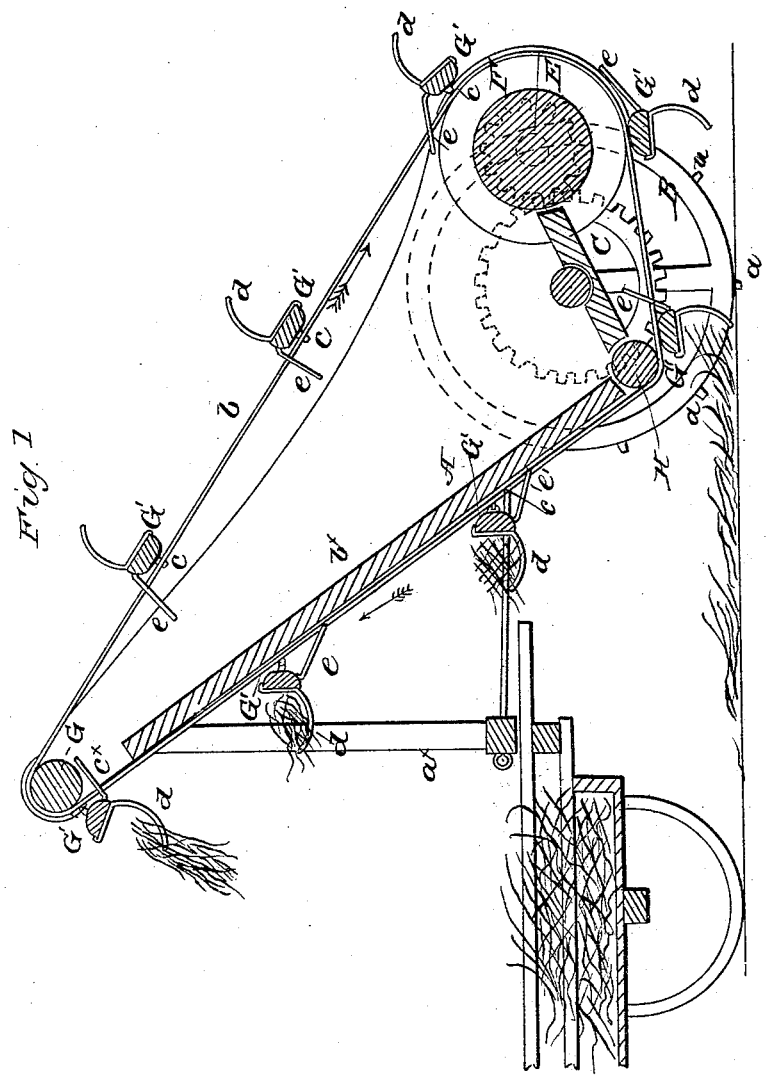

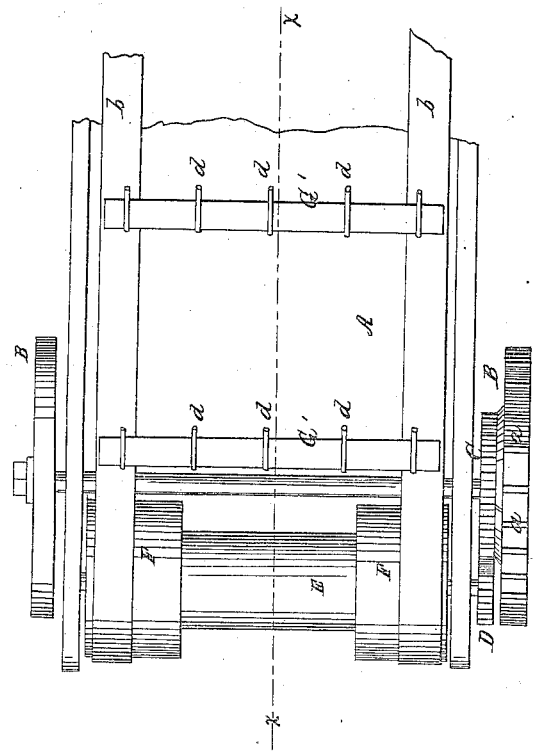
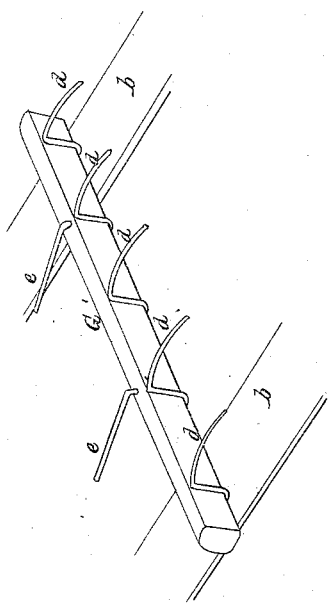

UNITED STATES PATENT OFFICE.

M. G. COUCH, OF ODESSA, NEW YORK.

IMPROVEMENT IN MACHINES FOR RAKING AND LOADING HAY

Specification forming part of Letters Patent No. 32,860, dated July 23, 1861.

*To all whom it may concern:*

Be it known that I, M. G. COUCH, of Odessa, in the county of Schuyler and State of New York, have invented a new and Improved Hay Raking and Loading Device; and I do hereby declare that the following is a full, clear, and exact description of the same, reference being had to the annexed drawings, making a part of this specification, in which—

Figure 1 is a vertical longitudinal section of my invention, the plane of section passing through the center, as indicated by the line $x\ x$, Fig. 3; Fig. 2, a detached perspective view of a portion of the endless rake; Fig. 3, a plan or top view of a portion of the same.

Similar letters of reference indicate corresponding parts in the three figures.

The object of this invention is to obtain a simple and efficient machine which may be attached to a cart or wagon, and as the latter is drawn along over the field serve to rake up the hay and discharge the same into the cart or wagon, the device working automatically, or by the simple draft movement of the device.

The invention consists in the employment or use of an endless belt of rakes applied to a mounted frame which is connected to the rear of the cart or wagon to be loaded, the rakes being so arranged as to discharge their loads at the proper point by means of their own gravity, in connection with that of the load, substantially as hereinafter described.

To enable those skilled in the art to fully understand and construct my invention, I will proceed to describe it.

A represents a box, the back part of which is supported by a pair of wheels, B, one of which is provided with spurs $a$ at its periphery, to prevent slipping. (See Fig. 1.) This wheel B has a toothed wheel, C, secured concentrically to it, and the wheel C gears into a pinion, D, which is at the end of a shaft, E, said shaft being on the back part of the box A and having a pulley, F, at each end of it, as shown in Fig. 3.

On the front part of the box A there is placed a roller, G, and over this roller and the pulleys F F endless straps $b\ b$ pass, to which bars $G'$ are attached transversely at suitable distances apart. The inner sides of the bars $G'$, are rounded in semi-cylindrical form, and they are attached to the straps $b$ by wires $c$, in such a manner as to admit of a certain play or rolling of the bars $G'$ at a certain point, which will be hereinafter described.

The straps $b\ b$ pass entirely around the box A and bear on a roller, H, at the angle at the bottom of the box, as shown clearly in Fig. 1.

Each bar $G'$ is provided with rake-teeth $d$, which are slightly curved, and project about at right angles from their bars at their outer or face sides, and to the inner side of each bar $G'$ there are attached rods $e$, as shown clearly in Figs. 1 and 2.

The box A, it will be seen by referring to Fig. 1, is of V form in its longitudinal section, and its front end is supported by uprights $a^x$ on the back part of the cart or wagon (shown in red in Fig. 1) to be filled or loaded. This form and position of the box brings the lower roller, H, of the straps $b\ b$ in quite close proximity to the surface of the ground.

The operation of the device is as follows: As the cart or wagon is drawn along, the wheel B and gearing C D communicate motion to the shaft E, and the straps $b\ b$, with their rakes, are moved in the direction indicated by the arrow in Fig. 1. As the rake-bars $G'$ pass under the roller H, they fill with hay, and each rake carries its load upward at the under or front side of the box A, the rake-bars being retained in proper position to sustain its load, in consequence of the rods $e$ bearing against the bottom $b^x$ of the box A, as will be fully understood by referring to Fig. 1. When, however, the rake-bars nearly reach the roller G, they tilt under the weight of their loads, in consequence of the rods $e$ passing off the bottom of the box A, and the load of each rake-bar is dumped consecutively into the body of the cart or wagon as the front end of the box A projects over the back part of the box of the cart or wagon. In order to insure the proper tilting of the rake-bars, it will be seen that the bottom $b^x$ must not extend fully up to the roller G; a space, $c^x$, must be allowed between to permit the rods $e$ to pass into previous to the turning of the bars $G'$ and the roller G.

I do not claim, broadly, the employment or use of an endless belt of rakes for raking up and loading wagons or carts with hay, for they have been previously used; but I do claim as new and desire to secure by Letters Patent—

The endless belt of rakes, when applied to a mounted box, A, and having its rake-bars G' attached loosely to its straps $b\ b$, and provided with rods $e$, so arranged in connection with the bottom $b^\times$ of the box that the rake-bars will be retained in proper position while carrying up their loads, and allowed to discharge them at their proper point by their own gravity, substantially as set forth.

M. G. COUCH.

Witnesses:
BURR SHELTON,
P. CATLIN.